Figure 1:
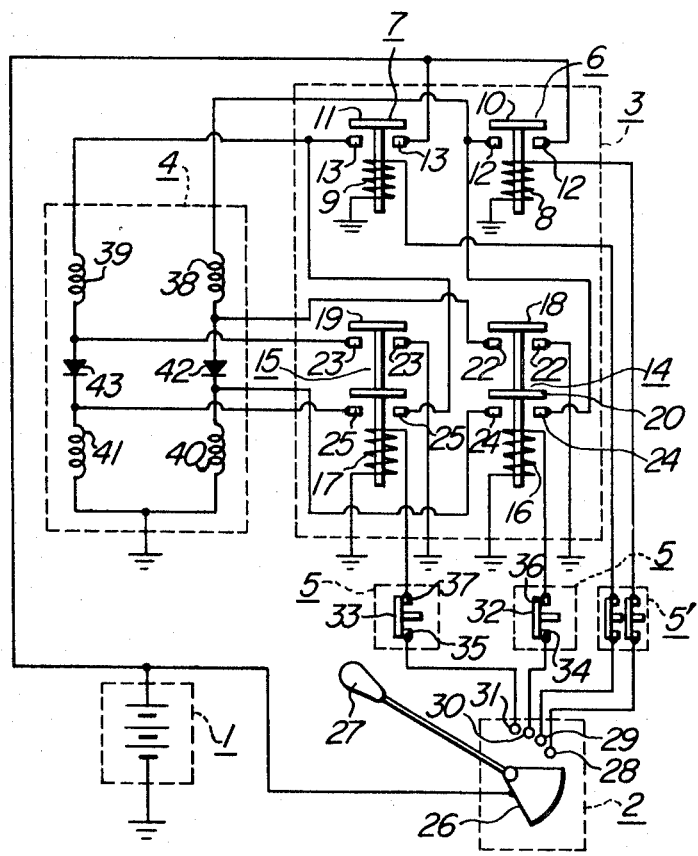

United States Patent

[11] 3,609,424

| [72] | Inventor | Tadao Murakami<br>Katsuta, Japan |
|---|---|---|
| [21] | Appl. No. | 35,060 |
| [22] | Filed | May 6, 1970 |
| [45] | Patented | Sept. 28, 1971 |
| [73] | Assignee | Hitachi, Ltd.<br>Tokyo, Japan |
| [32] | Priority | May 9, 1969 |
| [33] | | Japan |
| [31] | | 44/35167 |

[54] EDDY CURRENT-TYPE RETARDER
8 Claims, 2 Drawing Figs.

[52] U.S. Cl..................................................... 310/93,
310/94
[51] Int. Cl....................................................... H02k 49/04
[50] Field of Search........................................... 310/93, 94,
96, 92; 188/164, 165; 192/21.5, 18

Primary Examiner—D. X. Sliney
Attorney—Craig, Antonelli, Stewart & Hill

ABSTRACT: An eddy-current-type retarder wherein individual exciting coils are shiftably connected in series or in parallel with each other to obtain quick deceleration or slow deceleration as desired without degrading the utility of said exciting coils and the electric circuit is so arranged that the function of the retarder is automatically shifted from quick deceleration to slow deceleration within a safe range, as the temperature of said exciting coils rises.

EDDY CURRENT-TYPE RETARDER

The present invention relates to an eddy-current-type retarder which applies a braking force at a desired time to the driving shafts, for example, of trucks, buses streetcars, railroad cars and other rotating machines. More particularly, the invention relates to an eddy-current-type retarder including a stator with an exciting coil wound thereon and an electrically conductive disc mounted on a driving shaft to be braked in confronting relation to said stator with an air gap therebetween, said retarder being operative in such a manner that when the magnetic flux produced in said stator by said exciting coil passes the rotating conductive disc to form a closed circuit, an eddy current is generated in said conductive disc and thereby a braking force is applied to the driving shaft.

In general, the conditions of reducing the speed of a driving shaft by applying a braking force thereto are broadly classified into two types: namely a quick deceleration in the case when the necessity of reducing the speed of or stopping the driving shaft in a relatively short period of time has arisen from some cause during operation of the pertinent rotating machine, and a slow deceleration in the case when the necessity of reducing the speed of a driving shaft in a relatively long period of time has arisen from some cause during operation of the pertinent rotating machine.

In the case of automotive vehicles in particular, quick deceleration or quick stoppage of the vehicles becomes necessary when the preceding vehicle has suddenly come to halt or when a bus driver has noted a bus stop only a short distance before him. On the other hand, slow deceleration is necessary when a vehicle travels on a long-descending slope at a constant speed along the gradient of said slope.

As a braking system for automotive vehicles, it has been customary to use both a foot brake for normal use and an engine brake for use an an auxiliary brake which applies a braking force to the vehicle by closing the intake passage or exhaust passage of the engine. However, with the performance of engines being improved and the highway network being developed in recent years, the speed of the automotive vehicles tends to increase more and more and an extremely large braking force has now become necessary for either quick deceleration and slow deceleration. Under these circumstances, engine braking of about 0.02 g. in deceleration is no longer satisfactory to meet such demands, whereas a foot brake of about 0.6 g. in deceleration cannot be used in cases of emergency at high speeds, from the standpoint of safety because the application of the foot brake under such conditions will give a shock to the passengers and cause skidding of the vehicle. Furthermore, even if the foot brake is used after the speed of vehicle has been reduced by the engine braking to a level to permit the use of foot brake, the braking distance will be too long to attain the purpose of quick deceleration in cases of emergency.

Thus, a retarder which is called the third brake, has been highlighted in recent years.

The principle behind the eddy-current-type retarder, to which the present invention is directed, has briefly been explained hereinbefore. In short, the rotational energy of a drive shaft is converted into eddy current by the electromagnetic induction of the magnetic flux produced by an exciting coil and a retarding torque is created by the electromagnetic induction caused by the eddy current generated in a disc and said magnetic flux. The energy commensurate with the retarding torque is consumed by the heat generating action of the eddy current and the electric resistance of the disc and, as a result, a braking force is applied to the drive shaft.

It is ideal that the rotational energy is converted 100 percent to heat energy and that such heat energy is completely dissipated. However, this is impossible in practice. The braking capacity of the apparatus is limited by the conversion efficiency from rotational energy to electrical energy, the conversion efficiency from rotational energy to electrical energy, the conversion efficiency from electrical energy to heat energy, the heat energy dissipation capacity, the influence of temperature rise and the design problems.

The exciting coil used in this type of apparatus normally comprises a plurality of series coil groups connected to a power source in parallel relation, each of said coil groups consisting of a plurality of unit coils connected with one another in series. The braking force of the apparatus is controlled by suitably selecting the number of parallel coil groups to obtain the desired flux intensity.

The performance of this type of apparatus has been improved year by year and, for instance, an apparatus of the specification depicted in the table below enables a deceleration of about 0.06 g. to be obtained when used in combination with an engine brake, which deceleration is sufficient to meet slow deceleration demands.

| Retarder: | |
| --- | --- |
| Voltage | 24v. DC |
| Maximum retarding torque | 60 Kg-m |
| Rating | 30 minutes |
| Cooling system | Air cooling |
| Stages of conversion | Two stages |
| Weight | About 135 kgs |
| Vehicle: | |
| Total weight | 13,800 kgs |

However, the presently used retarders are not entirely satisfactory where the largest possible retarding torque is desired even for a short period of time, as in the case of emergency deceleration. Of course, the braking force can be increased by increasing the number of the parallel coils connected to the power source, but in this case, the retarder becomes extraordinarily large in size with respect to the design limit and hence impracticable. In addition, the number of the coils, not used in the case of slow deceleration increases so that the utility of the coils is lowered.

Furthermore, a large braking force is obtained in a so short period of time that the temperature rises quickly. Therefore, when the safety device used is of the type which is designed to interrupt the current before the insulation of the exciting coil fails, only by detecting the temperature rise, the circuit is broken in a short period of time and the braking force disappears before the vehicle is sufficiently decelerated.

An object of the present invention, therefore, is to provide an eddy-current-type retarder which has the same size and weight as those of the presently used retarders and is capable of maintaining the same degree of braking force as that of the latter in the case of slow deceleration, but which provides a stronger braking force than that of the latter at a desired time in the case of emergency deceleration, only by a single operation of a lever.

Another object of the invention is to provide an eddy-current-type retarder which is so designed that, when the temperature of the exciting coil rises during emergency deceleration of a rotating machine, said rotating machine is shifted from emergency deceleration to slow deceleration automatically.

Still another object of the invention is to provide an eddy-current-type retarder which provides a maximum braking force within a range so as not to give a shock to the human body.

Still another object of the invention is to provide an eddy-current-type retarder in which the utility of coils is high even during slow deceleration.

According to one aspect of the invention, there is provided an eddy-current-type retarder wherein a coil constituting either a stator or a rotor is divided into a plurality of unit coils and these unit coils are connected to a power source in two shiftable combinations, i.e., a first combination in which the unit coils are supplied with exciting current at which they can continuously be used for a long period of time relative to the rating of the individual unit coils and a second combination in which the unit coils are supplied with large exciting current at which they can continuously be used for a short period of time relative to the rating of the individual unit coils.

According to another aspect of the invention, there is provided an eddy-current-type retarder of the character described, wherein a plurality of unit coils are connected in series to the power source by the first operation of a lever and a plurality of the unit coils are connected in parallel to the power source by the second operation of the lever.

According to still another aspect of the invention, there is provided an eddy-current-type retarder of the character described, wherein said first and second combinations of the unit coils are shiftably connected to the power source in series or in parallel.

According to still another aspect of the invention, there is provided an eddy-current-type retarder of the character described, wherein said first and second combinations of the unit coils are respectively provided with safety devices of different ratings, whereby when the second combination is disengaged from the power source upon actuation of its safety device, the first combination is automatically connected to the power source and maintained in operation within the scope of rating of the unit coils therein.

Figure 2:
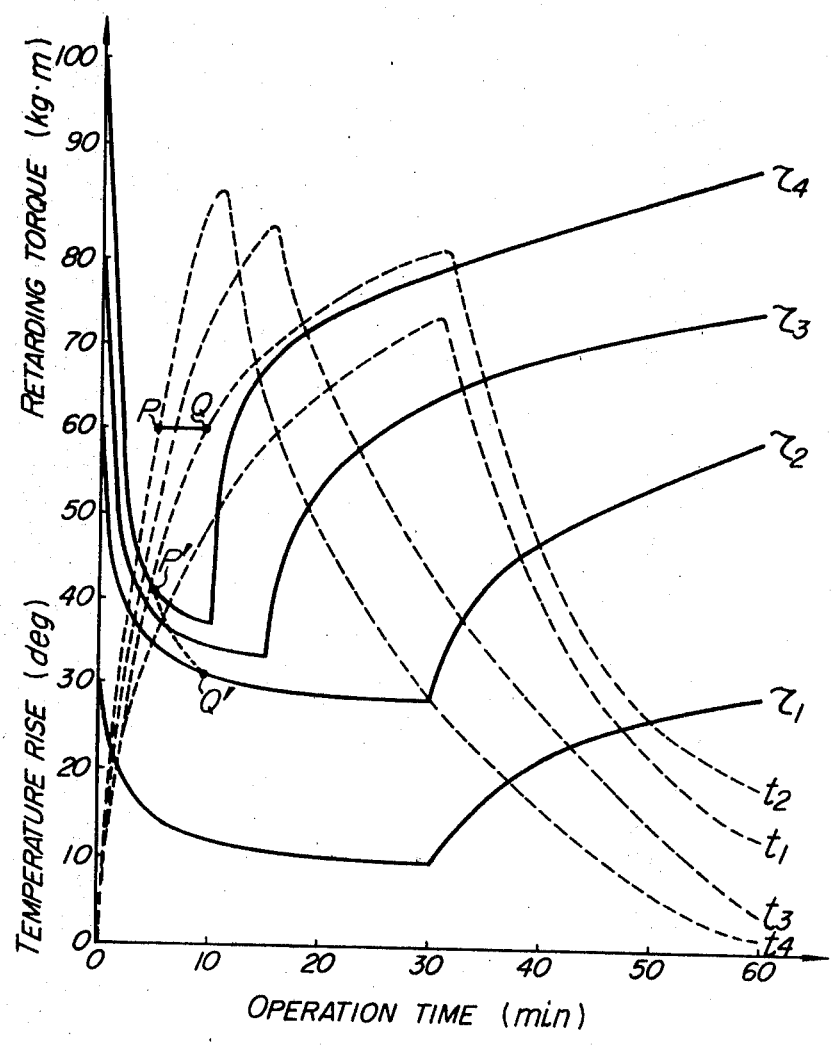

These and other objects, features and advantages of the present invention will become apparent from the following detailed description on an embodiment thereof when taken in conjunction with the accompanying drawings; in which:

FIG. 1 is an electrical connection diagram showing an embodiment of the eddy-current-type retarder according to the present invention; and FIG. 2 is a graph showing the relationship between the retarding torque and the temperature characteristic of the eddy-current-type retarder shown in FIG. 1.

Referring to the drawings and first to FIG. 1, reference numeral 1 designates a battery, 2 a changeover switch to be operated by a lever or the like, 3 a control box accommodating transfer relays, etc., 4 the main body of the retarder and 5 a switch to be operated by a timer or temperature detector.

Reference numerals 6, 7 designate primary relays having coils 8, 9 to energize said relays, movable contacts 10, 11 and fixed contacts 12, 13 respectively, said coils 8, 9 being grounded at one ends.

Reference numerals 14, 15 designate secondary relays having coils 16, 17 to energize said relays, movable contacts 18, 19, 20, 21 and fixed contacts 22, 23, 24, 25 respectively, said coils 16, 17 and said fixed contacts 22, 23 being grounded at one ends.

The changeover switch 2 has a movable contact 26 which is operated by a lever 27.

Reference numerals 28, 29, 30, 31 designate fixed contacts, of which 28 and 29 are connected with coils 8, 9 respectively.

The switch 5 has movable contacts 32, 33 and fixed contacts 34, 35, 36, 37. The contacts 34, 35 are connected to the contacts 30, 31 of the changeover switch 2, and the contacts 36, 37 to the contacts 34, 35, respectively.

The main body 4 of the retarder includes exciting coils 38, 39, 40, 41, constituting either a rotor or stator, and diodes 42, 43. The coils 38, 39 have one ends connected to the contacts 12, 24 and 13, 25 of the control box 3 respectively, with the other ends connected to the contact 22, the diode 42 and the contact 23, the diode 43, respectively.

The coils 40, 41 have one ends connected to the contact 24, the diode 42 and the contact 25, the diode 43 respectively, with the other ends being grounded.

The stator consisting of the coil and a disc brake may be of any construction known in the art, and those shown, for example, in U.S. Pat. No. 2,833,949 may be used.

The positive electrode of the battery 1 is connected to the contact 26 of the changeover switch 2 and the fixed contacts 12, 13 of the control box 3. In the main body 4 of the retarder, the coils 38, 40 are connected to the power source to form a series circuit as the first stage, and then the coils 39, 41 are connected to the power source to form a series circuit, in addition to the first stage, as the second stage. These first and second stages provide a main current retarder of a capacity which is usable for a long period of time. Further, the coils 38, 40 are connected to the power source to form a parallel circuit as the third stage and the coils 39, 41 are connected to the power source to form a parallel circuit as the fourth stage. The third and fourth stages provide an auxiliary eddy current retarder.

The retarder of the present invention constructed as described above operates in the following manner: Namely, when an automotive vehicle equipped with the retarder is operated on a descending slope of steep gradient, the changeover switch 2 is operated by the lever 27 to bring the movable contact 26 into contact with the fixed contact 28, whereupon the current supplied from the battery 1 flows through the movable contact 26, the fixed contact 28 and the coil 8 to the ground, so that the primary relay 6 is energized and the movable contact 10 engages the fixed contact 12. Therefore, the current energizes the series circuit of the coils 38, 40, i.e., the first stage of the retarder body, decelerating the automotive vehicle.

Where a greater deceleration is desired, the lever 27 of the changeover switch 2 is operated to engage the movable contact 26 with the fixed contact 29. The current flows from the battery 1 through the movable contact 26, the fixed contact 29 and the coil 9 to the ground, whereby the primary relay 7 is energized and the movable contact 11 is brought into contact with the fixed contact 13. Therefore, the current flows from the battery 1 through the fixed contact 13, the movable contact 11, the coil 39, the diode 43 and the coil 41 to the ground, and thereby the second stage of the retarder body 4 is also energized. Thus, the automotive vehicle is decelerated by the combined forces of the first and second stages. As a result, the automotive vehicle travels on the descending slope at the desired speed while suitably regulating the braking force according to the load and the gradient of the slope.

When it is desired to decelerate or stop the automotive vehicle in a short period of time by applying a braking force quickly, during travel on a flat road at a high speed or on a descending slope, the movable contact 26 is brought into contact with the fixed contact 28 or 29 by operating the lever 27 of the changeover switch 2, whereupon the current flows through the series circuits of the coils 38, 40 and 39, 41 respectively of the retarder body 4 as stated previously, whereby a braking force is generated. When the movable contact 26 is further operated by the lever 27 and brought into contact with the fixed contact 30, the secondary relay 14 is energized, with the movable contacts 18, 20 in engagement with the fixed contacts 22, 24 respectively.

Therefore, the current flows from the battery 1 through the fixed contact 12, the movable contact 10, the coil 38, the fixed contact 22 and the movable contact 18 to the ground and also through the fixed contact 12, the movable contact 10, the fixed contact 24, the movable contact 20 and the coil 40 to the ground. Thus, the coils 38, 40 are connected in parallel to the battery 1 and twice as much current flows as before, producing a large braking force.

Where it is desired to decelerate the automotive vehicle by an even greater braking force, the movable contact 26 is contacted with the fixed contact 31 by operating the lever 27, whereupon the current flows from the battery 1 through the movable contact 26, the fixed contact 31, the fixed contact 35, the movable contact 33, the contact 37 and the coil 17 to the ground, energizing the secondary relay 15 and engaging the movable contacts 19, 21 with the fixed contact 23, 25 respectively.

Therefore, the current flows from the battery 1 through the fixed contact 13, the movable contact 11, the coil 39, the fixed contact 23 and the movable contact 19 to the ground, and also through the fixed contact 13, the fixed contact 11, the fixed contact 25, the movable contact 21 and the coil 41 to the ground. Thus, the coils 39, 41 are connected in parallel to the battery 1 and a current twice as much as before flows therethrough, whereby a large braking force is generated and the automotive vehicle can be decelerated or stopped by said braking force in a short period of time.

Such operational characteristics of the present retarder are represented by the retarding torque vs. temperature rise curves in FIG. 2, wherein the solid lines represent the retarding torque characteristics and the broken lines represent the temperature rise characteristics.

Curve $\tau_1$ represents the retarding torque characteristic of the first stage of the retarder as measured in terms of a 30-minute rating, and the portion after 30 minutes indicates the recovery of retarding torque. The temperature rise characteristic of the retarder in this case is represented by curve $t_1$. Similarly, curves $\tau_2$, $t_2$, curves $\tau_3$, $t_3$ and curves $\tau_4$, $t_4$ represent the retarding torque characteristics and the temperature rise characteristics of the second, the third and the fourth stages respectively. It will be apparent from the diagram that, according to the present invention, retarding torque approximately twice as large as obtainable heretofore can be obtained, though the retarder is operable for a shorter period of time. The experiment has revealed that the fourth stage of the present retarder enables deceleration of as large as 0.1–0.12 g. to be obtained when used in combination with the engine brake. In the light of the fact that normally the human body feels shock of deceleration over about 0.15–0.2 g., it will be understood that the retarder of the present invention can apply a strong braking force as mentioned above to the vehicle, without giving shock to the human body.

With the conventional retarders of this type, it has been experienced that the braking force is diminished due to a failure or breakage of the coils in the retarder as a result of the coils being heated by the heat generated during operation by the eddy current or by being overloaded. According to the present invention, however, when the current has been passed through the coils 38 to 41 for a predetermined period or the temperature detected of the coils 38 to 41 has reached a predetermined level, in the energized state of the secondary relays 14, 15, the current supply to the coils 16, 17 of said secondary relays is interrupted by the switch 5 to deenergize said coils and thereby to avoid burning of the same. When the secondary relays 14, 15 are released upon opening of the switch 5, the coils 38, 40, 39, 41 having been connected in parallel with each other form series circuits of the coils 38 to 40 and 39 to 41 and these series circuits are connected to the power source in parallel relation, all automatically, whereby the circuit of the retarder is shifted from the fourth stage to the second stage automatically.

Therefore, when a switch 5', similar to the switch 5 but greater in rating than that of the latter, is provided in the circuits of the first and second stages and if the switch 5 is opened, for instance, at a point P on temperature rise characteristic curve $t_4$, the temperature rise characteristic is immediately shifted to a point Q on the temperature rise characteristic curve of the second state and the retarding torque is immediately shifted from a point P' on the retarding torque characteristic curve $\tau_4$ of the fourth stage to a point Q' on the retarding torque characteristic curve $\tau_2$, as shown in FIG. 2, and the vehicle can continuously be decelerated by the braking force of the second stage until the switch 5' is opened. In other words, the retarder will not suddenly cease its function during deceleration, even if the safety circuit is actuated.

As will be understood from the foregoing description, the retarder of the present invention enables an automotive vehicle, etc., to travel on a long descending slope at a constant speed over a lengthy period, following the gradient of said slope, while being decelerated slowly. Furthermore, when the vehicle is running at a high speed, the retarder of the invention produces a large braking force in a short period of time, so that the vehicle can be decelerated or stopped quickly and safely without giving shock to the passengers. Still further, the retarder of the invention is of great practical advantage because it can be obtained only by changing the electrical connection of the circuit of the presently used retarders and can maintain the high utility of exciting coils even in the case of slow deceleration.

It is to be understood that, although the function of the present retarder has been described on an embodiment which comprises two sets each of the primary relay and the secondary relay, the similar function may be obtained by using one or more than two sets of the same.

It is also to be understood that the diodes 42, 43 in the circuit of the embodiment described herein may be replaced by relays and further the relays in the circuit may be replaced by semiconductor elements respectively.

It is also to be understood that, while in the embodiment described herein the protective switches are provided in the circuits of the fourth and the second stages, such switch may be provided in the circuit of each stage so that the switches of the respective stages will be opened one after another in sequence.

It should also be understood that many modifications and changes are possible to the details of the retarder described and illustrated herein, without deviating from the technical concept of the invention and that the scope of the invention is not restricted only to the embodiment shown.

Although the present invention has been described as applied to an automotive vehicle for the sake of convenience in explanation, it is applicable not only thereto but also in a wide range of the art wherein the technical concept of the invention described herein needs to be applied.

What is claimed is:

1. An eddy-current-type retarder wherein a coil constituting either a stator or a rotor is divided into a plurality of unit coils and these units coils are connected to a power source in two shiftable combinations, i.e., a first combination in which the unit coils are supplied with an exciting current at which they can continuously be used for a long period of time relative to the rating of said individual unit coils and a second combination in which the unit coils are supplied with a large exciting current at which they can continuously be used for a short period of time relative to the rating of said individual unit coils.

2. An eddy-current-type retarder as defined in claim 1, wherein a plurality of said unit coils are connnected to the power source substantially in series when slow deceleration is desired and a plurality of said unit coils are connected to the power source substantially in parallel when quick deceleration is desired.

3. An eddy-current-type retarder as defined in claim 1, wherein said first and second combinations of a plurality of unit coils can shiftably be connected to the power source in series or in parallel.

4. An eddy-current-type retarder as defined in claim 1, wherein safety devices of different ratings are provided in the exciting circuits for said first and second combinations of the unit coils respectively and, when the safety device provided in the exciting circuit for the second combination of the unit coils is actuated to disconnect said exciting circuit from the power source, the exciting circuit for the first combination of the unit coils is automatically energized by the current from the power source and maintained in the energized state within the scope of rating of the unit coils thereof.

5. An eddy-current-type retarder comprising a plurality of unit coils shiftably connected to a power source in series or in parallel by connecting means, means for giving said connecting means an instruction to produce a desired connection and means for controlling the state of connection of said connecting means upon comparing the rating of said unit coils and the load imposed on said unit coils with each other.

6. An eddy-current-type retarder as defined in claim 1, wherein a primary relay is provided to control a circuit through a plurality of unit coils connected through intermediate switch means adapted to be closed only for series operation in said first combination; a secondary relay connecting across the terminals of said switch means for conducting a large exciting current through said coils and secondary relay to obtain said second combination; a protective switch to control said secondary relay to prevent burning of said unit coils and a lever switch connecting the relays to said power source.

7. An eddy-current-type retarder as defined in claim 6, wherein said switch means adapted to be closed only when the unit coils are connected in series with each other is a diode.

8. An eddy-current-type retarder as defined in claim 6, wherein said protective switch is of the type which is opened upon sensing the temperature of the exciting coils.